No. 805,327. PATENTED NOV. 21, 1905.
C. F. A. STURTS.
ELECTRIC SELF WINDING CLOCK.
APPLICATION FILED JUNE 3, 1904.
2 SHEETS—SHEET 1.
*Fig. 1.*
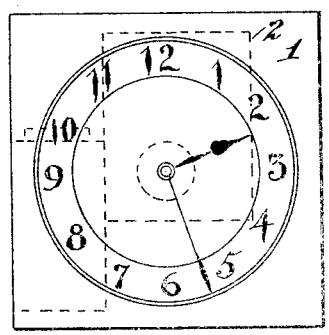
*Fig. 2.*
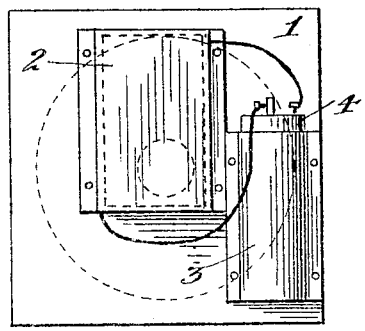
*Fig. 3.*
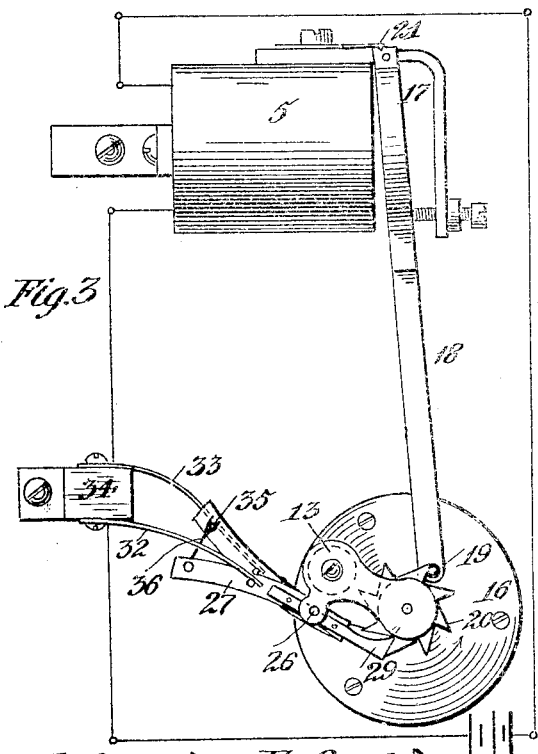
*Fig. 4.*
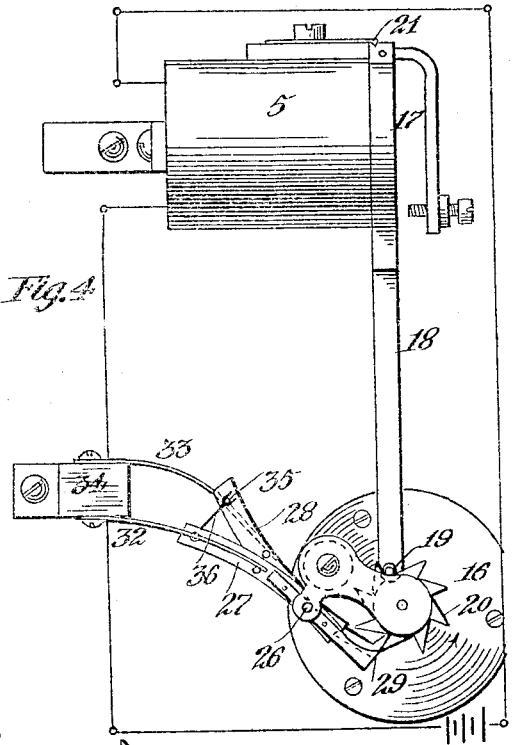
*Fig. 8.* *Fig. 9.*
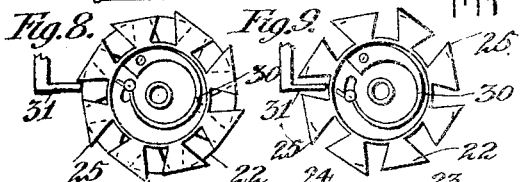
*Fig. 10.*
*Fig. 11.*
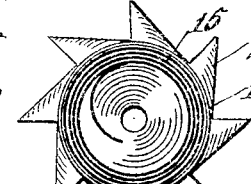
*Fig. 12.*
*Fig. 13.*
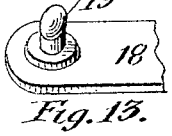
WITNESSES:
M. R. Seely
Frank F. Eggers
INVENTOR:
C. F. A. Sturts
by Spear & Seely
Attorneys No. 805,327. PATENTED NOV. 21, 1905.
C. F. A. STURTS.
ELECTRIC SELF WINDING CLOCK.
APPLICATION FILED JUNE 3, 1904.
2 SHEETS—SHEET 2.
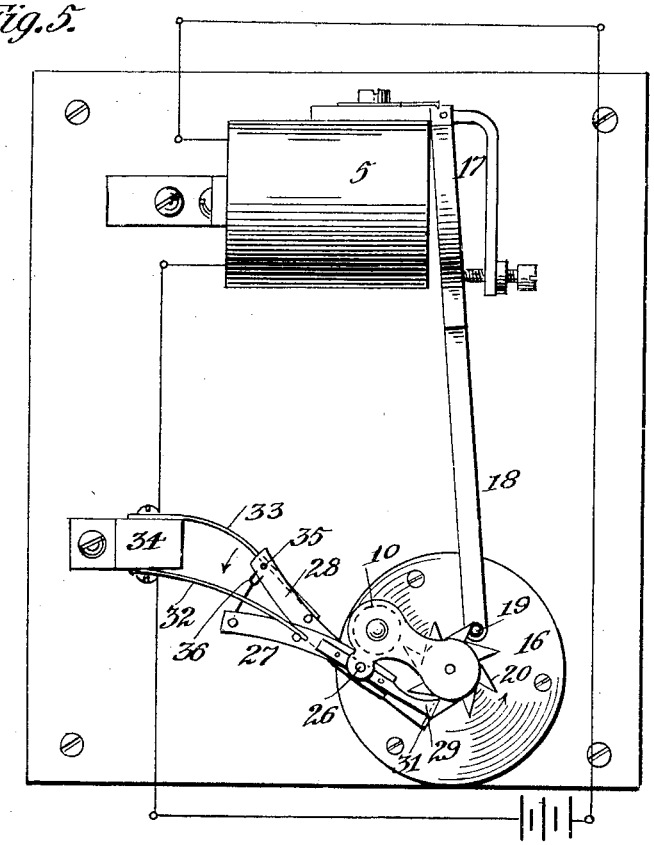
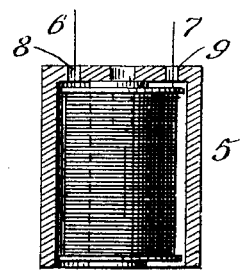
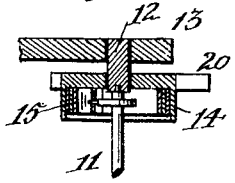
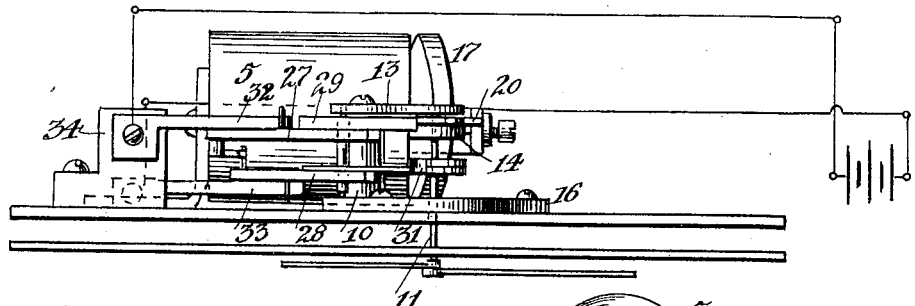
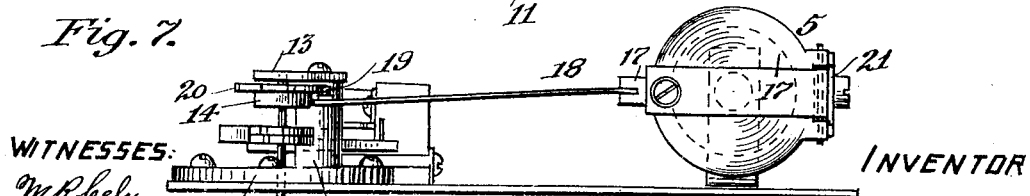
WITNESSES:
M. R. Seely
Frank F. Eggers
INVENTOR
C. F. A. Sturts
by Spear & Seely Attys

UNITED STATES PATENT OFFICE.

CHARLES F. A. STURTS, OF SAN FRANCISCO, CALIFORNIA.

ELECTRIC SELF-WINDING CLOCK.

No. 805,327.     Specification of Letters Patent.     Patented Nov. 21, 1905.

Application filed June 3, 1904. Serial No. 211,056.

*To all whom it may concern:*

Be it known that I, CHARLES F. A. STURTS, a citizen of the United States, residing at San Francisco, in the county of San Francisco and State of California, have invented certain new and useful Improvements in Electrical Winding Apparatus, of which the following is a specification.

My invention relates to electrical means for winding the springs of timepieces.

The object of my invention is to provide an apparatus for this purpose in which simplicity in construction is combined with great accuracy and certainty in operation; further, to do away with the electric motors commonly employed in electrical clock-winding devices and to use instead a battery and an electromagnet and to so control the application of the current that it is used with the utmost economy, enabling the device to operate during very long periods of time. By my device winding impulses are imparted at comparatively short intervals by means of electrical contacts of exceedingly short duration. In practice I have estimated the duration of the contacts employed by me at one one-hundredth of a second, and if, for example, eight of such contacts occur in the hour it is easy to calculate that with even a single cell of dry battery it will require several years to exhaust it even with the ordinary battery losses and deterioration not due directly to the closing of the circuit.

An embodiment of my invention is shown in the accompanying drawings, in which—

Figure 1 is an elevation of a clock-face with the casing of the winding mechanism and the battery-receptacle shown in dotted lines. Fig. 2 is an opposite elevation of the same. Fig. 3 is an elevation of the winding mechanism, showing an electromagnet with an armature-lever for giving an impulse to the winding mechanism, the parts being in the position they assume immediately before the impulse. Fig. 4 is a similar elevation in which the impulse has been imparted, the electrical contacts not having been broken. Fig. 5 is a similar elevation with contacts broken and the parts in their normal position between impulses. Fig. 6 is a bottom plan view of the entire winding mechanism. Fig. 7 is a side elevation of the same. Fig. 8 is an elevation of the associated controlling and guard wheels on the center post or arbor. Fig. 9 is a similar elevation with the recesses in said wheels registering. Fig. 10 is a cross-section of both said wheels. Fig. 11 is an elevation of the winding-ratchet and the barrel inclosing the mainspring. Fig. 12 is a cross-section of the same. Fig. 13 shows the end of the armature-lever and the beveled stud which actuates the winding-ratchet. Fig. 14 is a longitudinal section of the magnet-casing with inclosed spool. Fig. 15 is a section to show the mounting of the main arbor, winding-ratchet, and spring-barrel.

In Figs. 1 and 2 the number 1 may represent any suitable support carrying on one side a clock-face and on the other a casing 2, which contains the time-movement and the winding mechanism. The support has preferably a receptacle 3 to contain a battery 4. This makes a compact and convenient construction in which all parts are carried by the same support. The magnet 5 may be of any desired construction. I have shown a single spool inclosed in a soft-iron casing and screwed firmly to the same. The open end or rim of the spool-casing forms one pole and the core of the spool the other. The circuit-wires 6 and 7 from the battery are led in to the spool through holes 8 9 in the magnet-casing. The circuit is normally open and is closed at intervals, as hereinafter described.

The center post or arbor of a clock, watch, or chronometer movement is shown at 11 projecting through the clock-front and carrying the hands and at its other end having a bearing in a stud 12 of the fixed bridge 13, which is secured to the movement-plate by a post 10. A barrel 14 has a bearing on the stud 12 and contains the mainspring 15, connected so as to transmit movement to the arbor in the usual way. This barrel has a ratchet-rim 20. A movement-plate is represented at 16 and is supposed to contain the train and the regulating and controlling parts of a time-movement of any desired character; but as these features form no part of my invention I have considered it sufficient to show the main arbor and the means from which it derives its motion. The armature 17 of the magnet carries an arm 18, which is flexible, so that it can spring slightly sidewise, and which has at its free end a beveled stud 19. This arm projects far enough for its stud to engage the teeth of the winding-ratchet 20. When the armature is attracted, the ratchet will be moved in the proper direction for winding the spring. When the armature is released, a spring 21 at its attached end throws it out to normal position and causes the beveled stud 19 on the spring-arm 18 to slip back and over the next ratchet-tooth, the rear edge of each tooth being also beveled, as shown at 21 in Figs. 11 and 12. Fixed on the main arbor between the movement-plate and the winding-barrel is a toothed controlling-wheel 22, having a circular periphery broken by recesses, which widen toward the center. This wheel has an extended hub 23, (shown in Fig. 10,) and on the hub is placed, directly alongside of wheel 22, a guard-wheel 24, having a pin-and-slot connection with the wheel 22, which allows it a little movement independently of the hub upon which it is mounted. A spring 30 in the hollow body of wheel 24 tends to keep it in the position of Fig. 8. The wheel 24 has recesses shaped like those in wheel 22 and adapted to register with them; but between these recesses its faces are flat and project at one edge beyond the arc of the periphery of wheel 22, as shown at 25. In the construction shown there are eight of these recesses in each wheel, and they control the application of the winding impulses, so that such intervals take place at the rate of eight in an hour or one every seven and one-half minutes.

Mounted upon a pin 26 in the bridge 13 are two levers or arms 27 28. The lever 27 carries a pawl 29, which is adapted to engage with the teeth of the winding-ratchet, as shown in Fig. 3. The lever 28 has a detent 31, adapted to act in connection with the wheels 22 and 24 and to engage with the recesses in both when they register. Springs 32 33 tend to press both levers in the direction of the arrow in Fig. 5—that is, such springs tend to engage the parts 29 31, respectively, with ratchet 20 and with wheels 22 and 24. The circuit-wires are in communication with these springs, which are of course insulated from each other, as by a rubber block 34, and the levers 27 28 are also of insulating material. On one of the levers, as 28, is a pin 35, which is a contact member. On the other lever 27 is a fork 36, which is the other contact member, and the two form a circuit-closer and circuit-breaker. The combination of a fork and pin makes an exceedingly quick and effective circuit-controller whether in making or in breaking the circuit and also forms a self-cleaning contact. Between winding inpulses the circuit is open, as shown at the contacts in Fig. 5, and no impulse can be given until the circuit is closed. The two wheels 22 and 24 act as a circuit-controller, because it is only when the recesses in said wheels register that the detent 31 can fall into the associated recesses and enable spring 33 to force the pin 35 into the fork 36. For the greater part of the interval between two impulses the positions of wheels 22 and 24 are as shown in Fig. 8, both wheels moving together with the arbor, their recesses out of register and the detent 31 riding on their peripheries. The registry or alinement of the recesses which permits the detent to drop into them is produced in the following manner: As the two wheels move together one of the projecting angles of wheel 24 strikes the detent which is in its path, and as wheel 24 is loosely mounted it is arrested, while wheel 22 continues its motion until the two recesses adjacent to the detent are in alinement. Instantly the spring 33 acts the detent enters the recesses, and the pin contact engages the fork contact. The recesses are wider at the bottom in order to insure a complete clearance and prevent any bearing or rubbing of the detent against their sides. The making of the contact causes the attraction of the armature, which gives a winding impulse to the ratchet and spring-barrel. The pawl 29 has been in engagement with the ratchet and holding the arm 27 immovable, but the movement of the ratchet away from the pawl causes such pawl to ride upon the incline of the next tooth against the pressure of spring 32 until it is released by the passage of the end of that tooth beyond it. Instantly spring 32 snaps it into the next notch of the ratchet, and by the same action withdraws the fork from the pin and breaks the contact. The lifting of the pawl 29 by the ratchet-tooth and the consequent movement of lever 27, of which said pawl forms a part, transmits motion to the lever 28 and raises detent 31 from the associated recesses in wheels 22 and 24. At the same time the other end of arm 27 presses the fork into close contact with the pin, the lever 28 yielding to the pressure. As soon, however, as pawl 29 springs into the ratchet the fork contact moves sharply away from the pin and spring 33 presses detent 31 toward the controller. As spring 30 acted as soon as the detent was pushed out of the recesses, the position of wheels 22 and 24 changed from that of Fig. 9 to that of Fig. 8, leaving a continuous periphery for the detent to bear upon.

Referring to the successive operations illustrated by Figs. 3, 4, and 5, it will be seen that in Fig. 3 the circuit has been closed. This was caused by the detent 31 entering the recesses in the controller, as shown in Fig. 9. Of course all the operations take place practically instantaneously, since it is estimated that the duration of the electrical contact is only about one one-hundredths of a second; but in Fig. 3 it is assumed, for the sake of clearness in description, that although the contact has been made the armature has not yet been attracted. The pawl 29 is in a notch of the winding-ratchet. In Fig. 4 the armature has been attracted, the winding impulse has been given, the pawl 29 has been forced out to the extreme point of a ratchet-tooth, and the lever 27 has pressed the yielding lever 28 upwardly, maintaining the contact. In Fig. 5 the pawl 29 has sprung into the next notch of the ratchet and has broken the contact in the manner before described. The detent 31 is riding on the now continuous periphery of the associated wheels 22 and 24, the armature has been thrown out, and the beveled stud on its spring-arm has slipped past the next ratchet-tooth into position for another winding impulse. The apparatus is in normal position and will remain there until the next contact is made.

In showing and describing eight recesses in the controller, giving winding intervals of seven and one-half minutes, I do not limit myself to that particular number of recesses, as more or fewer can be used. I have found in practice, however, that winding intervals of the said duration are the most satisfactory. If the winding intervals are very short, too many contacts are made and the battery is too rapidly exhausted. If the winding impulses are very long, much more power is required to turn the spring-barrel to the greater extent required, and it would be difficult to actuate the barrel by the direct movement of the armature.

I do not limit myself to the specific constructions and arrangements described herein and shown in the drawings, as I desire to avail myself of such modifications and equivalents as fall properly within the spirit of my invention.

Having thus fully described my invention, what I claim as new, and desire to secure by Letters Patent, is—

1. In electric winding apparatus, the combination with an arbor of a timepiece, of a winding barrel and spring for actuating said arbor, an open electric circuit, a magnet and armature in the circuit adapted to give winding impulses to said barrel and spring, a controller comprising a recessed wheel fixed on the arbor, a guard-wheel loosely connected to the controller and having similar recesses normally out of register with the recesses in the controller, a pivoted lever carrying at one end a contact and at the other a detent, and a second contact; the detent being adapted to arrest the guard-wheel and so permit the said recesses to register, and then to enter the associated recesses and thereby cause the making of the contact.

2. In electrical winding apparatus, the combination with the arbor of a timepiece, of a controlling-wheel fixed upon said arbor and a guard-wheel loosely mounted alongside of and loosely connected to the controlling-wheel, the controlling-wheel having a circular periphery broken by recesses, and the guard-wheel having peripheral angles and broken by recesses; and a spring tending to keep the recesses in the guard-wheel out of alinement with those in the controlling-wheel.

3. In an electric winding apparatus, the combination with a timepiece-arbor, of a spring-barrel having a ratchet-rim the teeth of which are beveled on one side, an electromagnet, an armature having an elastic arm capable of moving sidewise from its operative line of motion, and a beveled projection on the side of said arm adapted to actuate the ratchet and to move backward and sidewise over the beveled face of the ratchet-teeth.

4. In electrical winding apparatus, the combination of the following elements: a timepiece-arbor, a winding spring and ratchet, means for giving successive impulses to the ratchet, a recessed wheel on the arbor, a guard-wheel loosely connected thereto, and also recessed, a spring-pressed arm having a detent and carrying a contact, another spring-pressed arm having a pawl for engaging the ratchet, and a contact carried by said last-named arm; all constructed and arranged for the performance of the following operations: the alinement of the two recessed wheels, the entrance of the detent into two alined recesses thereof causing the making of the contacts and a movement of the ratchet, the riding of the pawl outwardly upon a tooth of the ratchet causing an increased pressure between the contacts and the retreat of the detent, the springing of the pawl in behind the said tooth of the ratchet causing the breaking of the contacts, and the reëstablishment of the recessed wheels with their recesses out of alinement.

5. A controller for electrical winding apparatus, comprising in combination with an arbor of a timepiece, a recessed wheel fixed on said arbor, a loose guard-wheel also recessed and having a pin-and-slot connection with said wheel, a spring bearing on the pin and tending to keep the recesses in the two wheels out of alinement, and a detent for arresting the guard-wheel whereby the recesses can come into alinement and admit said detent.

In testimony whereof I have affixed my signature, in presence of two witnesses, this 23d day of May, 1904.

CHARLES F. A. STURTS.

Witnesses:
 L. W. SEELY,
 FRANK F. EGGERS.